United States Patent
Ikegami et al.

(10) Patent No.: US 7,467,600 B2
(45) Date of Patent: Dec. 23, 2008

(54) ANIMAL LITTER

(75) Inventors: Takeshi Ikegami, Tokyo (JP); Takayuki Matsuo, Tokyo (JP); Shingo Shimizu, Tokyo (JP)

(73) Assignee: Uni-Charm Petcare Corporation, Tokyo (JP)

( * ) Notice: Subject to any disclaimer, the term of this patent is extended or adjusted under 35 U.S.C. 154(b) by 3 days.

(21) Appl. No.: 11/208,016

(22) Filed: Aug. 22, 2005

(65) Prior Publication Data

US 2006/0112894 A1    Jun. 1, 2006

(30) Foreign Application Priority Data

Aug. 20, 2004   (JP)   ............ 2004-241312
Mar. 23, 2005   (JP)   ............ 2005-084643

(51) Int. Cl.
*A01K 1/01*   (2006.01)
*A01K 29/00*   (2006.01)

(52) U.S. Cl. .................................... 119/171

(58) Field of Classification Search ......... 119/171, 119/28.5; 424/76.6
See application file for complete search history.

(56) References Cited

U.S. PATENT DOCUMENTS

| | | | |
|---|---|---|---|
| 4,444,148 A | 4/1984 | Lander | |
| 4,471,717 A | 9/1984 | Lander | |
| 4,640,225 A * | 2/1987 | Yananton | ............... 119/169 |
| 4,829,045 A | 5/1989 | Fransham | |
| 5,025,752 A | 6/1991 | Yananton | |
| 5,031,578 A * | 7/1991 | Hammons et al. | ......... 119/167 |
| 5,038,721 A * | 8/1991 | Ouellette et al. | ........... 119/167 |
| 5,271,355 A | 12/1993 | Bilings | |
| 5,358,607 A | 10/1994 | Ellis | |
| 5,359,960 A | 11/1994 | Yananton | |
| 5,614,458 A | 3/1997 | Webb et al. | |
| 5,618,428 A * | 4/1997 | Oslund | .................. 210/602 |
| 5,630,376 A * | 5/1997 | Ochi et al. | ................. 119/169 |
| 5,830,765 A | 11/1998 | Santioemmo et al. | |
| 5,860,391 A | 1/1999 | Maxwell et al. | |
| 6,287,550 B1 | 9/2001 | Trinh et al. | |
| 6,612,258 B2 * | 9/2003 | Isman et al. | ............... 119/171 |
| 6,797,036 B2 | 9/2004 | Funke et al. | |
| 2003/0101940 A1 * | 6/2003 | Isman et al. | ............... 119/28.5 |
| 2003/0191204 A1 | 10/2003 | Hermann et al. | |
| 2004/0255869 A1 | 12/2004 | Matsuo et al. | |
| 2005/0005869 A1 * | 1/2005 | Fritter et al. | ............... 119/173 |

(Continued)

FOREIGN PATENT DOCUMENTS

EP   0 153 441 A   9/1985

(Continued)

OTHER PUBLICATIONS

EP Search Report for Application No. 05255149.6-2313 issued Aug. 8, 2007.

*Primary Examiner*—Yvonne R. Abbott
(74) *Attorney, Agent, or Firm*—Lowe Hauptman Ham & Berner, LLP

(57) ABSTRACT

Provided is a litter, related to litter used for animal litter, which suppresses odors due to excretory substances remaining in litter and litter container using thereof.

This animal litter comprises a plurality of granular materials, one part of a surface thereof comprising first granular material having water-shedding properties and second granular material having liquid-absorbing properties.

9 Claims, 3 Drawing Sheets

U.S. PATENT DOCUMENTS

| | | | |
|---|---|---|---|
| 2005/0005870 A1 | 1/2005 | Fritter et al. | |
| 2005/0132968 A1 | 6/2005 | Swank | |
| 2005/0263080 A1* | 12/2005 | Campbell et al. | 199/28.5 |
| 2006/0102085 A1* | 5/2006 | Chen | 119/171 |
| 2006/0112893 A1* | 6/2006 | Ikegami et al. | 119/171 |
| 2006/0112894 A1* | 6/2006 | Ikegami et al. | 119/171 |
| 2006/0124069 A1* | 6/2006 | Wong et al. | 119/171 |
| 2006/0201438 A1 | 9/2006 | Antrilla et al. | |
| 2006/0243212 A1 | 11/2006 | Jenkins et al. | |
| 2007/0017453 A1 | 1/2007 | Fritter et al. | |

FOREIGN PATENT DOCUMENTS

| | | |
|---|---|---|
| EP | 0 453 414 A | 10/1991 |
| JP | 09-271283 | 10/1997 |
| JP | 09-313060 | 12/1997 |
| JP | 10-229768 | 9/1998 |
| JP | 11-127713 | 5/1999 |
| JP | 11-318252 | 11/1999 |
| JP | 2000-32860 | 2/2000 |
| JP | 2001-346466 | 12/2001 |
| JP | 2002-142589 | 5/2002 |
| JP | 2005-21071 | 1/2005 |

* cited by examiner (A)

(B)

ANIMAL LITTER

CROSS-REFERENCE TO RELATED APPLICATIONS

This application is based upon and claims the benefit of priority from Japanese Patent application No. 2004-241312 filed on Aug. 20, 2004, and Japanese Patent application No. 2005-084643 filed on Mar. 23, 2005.

FIELD OF THE INVENTION

The present invention is related to animal litter used as material laid in litter containers for animals such as cats and dogs

RELATED ART

Plastic box-shaped containers lined with so-called "cat litter", litter comprising of granular materials, are used as litter container for animals such as cats and dogs which are kept indoors. Excretory substances, such as urine excreted from an animal, are absorbed by such litter. The pet owner removes litter soiled by urine and feces from the container along with the feces and the like and replenishes it with new litter according to the amount removed. However, cats habitually mix the litter with their feet after excretion, and therefore, a large amount of litter soiled by urine and feces may stick to the cat's feet. Furthermore, because of such cat's motion, the soiled litter is spread, and it becomes difficult to completely eliminate only the soiled portions.

Mineral based zeolite and sand from rivers, bentonite which hardens after absorbing liquid, and cellulose formed by solidifying ground pulp and the like into grains are utilized for litter in such litter containers. However, zeolite and sand from rivers do not absorb urine, and bentonite and pulp not only have poor absorbency, but also have no deodorizing power. Furthermore, the urine of animals, cats in particular, has powerfully foul odor which fills the entire room wherein the litter container is placed and cleaning up of the litter container entailed disgust.

As litter which resolves such issues, a porous water-resistant silica gel having strong deodorizing power and absorbency (for example, refer to Patent Reference 1) has been employed. In addition, a litter made from material having water-shedding properties which suppresses a generation of odors through the combined use of liquid-absorbent sheets which absorb moisture such as urine (for example, refer to Patent Reference 2) has been employed.

Patent Reference 1: Japanese Patent No. 2766632
Patent Reference 2: Japanese Patent Laid-Open Publication No. 10-229768

However, the particle diameter of the litter described in patent Reference 1 is small, 2 mm to 6 mm, in order to reduce the surface area of the litter and space therebetween by reducing the particle diameter and to absorb urine efficiently. In addition, in order to increase the absorption speed and the maximum absorbable amount of liquid by setting the moisture content low, the litter is adjusted to a moisture content of 3% by weight or less after drying at a temperature of 90° C. to 120° C. Thus, this litter has a high absorption speed and can quickly absorb excreted urine and the like. However, it is unsanitary because silica gel which has absorbed large amounts of urine is left in the litter container, and in addition, causes the generation of foul odor.

In addition, because the granular materials which comprise the litter described in Patent Reference 2 do not have liquid-absorbing properties, in case urine remains on the surface of the granular materials without passing therethrough, the remaining urine decomposes and generates foul odors. Furthermore, because moisture from feces, the amount of which is not large enough to flow, cannot pass through the litter, the odor of feces may remain. Therefore, it becomes necessary to discard the soiled portion of the litter every time a pet excretes or completely replace the litter at a pace of once every one or two weeks. Additionally, not only the litter but also the liquid-absorbent sheet must also be exchanged with a fresh sheet, and therefore, large amount of waste is generated.

SUMMARY OF THE INVENTION

The present invention has been made to resolve the foregoing issues. The object thereof is to provide an animal litter for a dual structure litter container which uses both litter and liquid-absorbent sheet, and the animal litter has liquid-passing properties for transferring the majority of liquid excretory substances to the liquid-absorbent sheet and absorbency for enabling moisture which cannot be passed to be absorbed into the litter with the passage of time. The dual structure makes the litter capable of being used for long periods of time.

More specifically, the present invention provides the following;

(1) An animal litter comprising a plurality of granular materials wherein the plurality of granular material comprises:

a first granular material having water-shedding properties; and a second granular material having liquid-absorbing properties.

According to the invention in (1), the absorption speed of the granular material can be suppressed by having first granular material comprising the water-shedding properties and second granular material comprising the liquid-absorbing properties. Through this, liquid first quickly passes through the spaces between the granular materials. Then, the liquid remaining on the surface of the granular material is absorbed into the second granular materials having the liquid absorption property with the passage of time. Therefore, moisture less remains on the surface of the litter, and a dry state can be kept easily.

(2) The animal litter according to (1) wherein a content of the first granular material is larger than a content of the second granular material.

According to the invention in (2), by setting the content of the first granular material is larger than the content of the second granular material, it becomes difficult for moisture to remain on the surface of the litter, and a drier state is more easily kept. The content percentage of the first granular material is preferably 90% or less (by volume), and more preferably, 50% or more. In case the content percentage is 50% or more, the liquid-absorbing part is in contact with the water-shedding part, making it difficult for liquid to remain.

(3) The animal litter according to (1) or (2) wherein a surface area of the second granular material is larger than a surface area of the first granular material.

According to the invention in (3), by setting the surface area of the first granular material is larger than the surface area of the second granular material, it becomes difficult for moisture to remain on the surface of the litter, and a drier state is more easily kept. This is because a dry state cannot be kept in case the area of this first granular material, to which water-shedding processing has not been performed, is larger, since liquid is absorbed without being passed through. In addition, the shape of the first granular material is preferably spherical, pellet-shaped, or tablet-type (pill-shaped) and preferably has a diameter (length) of 4 mm to 14 mm in size.

(4) The animal litter according to any one of (1) to (3) which is used in combination with liquid-absorbent sheet having liquid-absorbing properties.

According to the invention in (4), by using litter and liquid-absorbent sheet in combination and enabling quick absorption of liquid from excretory substances into the liquid-absorbent sheet, it becomes possible to suppress the generation of odors and, in addition, keep the litter in a dry state. This liquid-absorbent sheet is for absorbing liquid which has passed through the litter according to the present invention and is laid on the bottom surface of the litter container. Litter container used for combinational use of litter and liquid-absorbent sheet like this has a dual structure of a litter storage part for storing litter and a liquid-absorbent sheet storage part for placing the liquid-absorbent sheet, and preferably, the bottom surface part of the litter storage part has a plurality of holes.

(5) The animal litter according to any one of (1) to (4) wherein the liquid passing ratio of the entire plurality of granular materials is 50% or more.

According to the invention in (5), by setting the liquid passing ratio of the granular materials 50% or more, moisture from excretory substances passes through the litter more easily, and this is particularly effective while the animal litter is used in combination with the liquid absorbent sheet. Furthermore, liquid passing ratio of the granular materials is preferably 80% or more.

[Test Method for Liquid Passing Ratio]

"Liquid passing ratio" in the present specification is, for example, the values measured in procedures 1) to 6), described below.

1) As shown in FIG. 1, a weight A of a pet toilet sheet 503 (preferably having properties described hereafter; for example, "Deo-sheet": registered trademark, product of Uni-Charm Petcare Corporation is used preferably) is measured;
2) A cylinder 501 (for example, a cylinder with a diameter of 75 mm and a depth of 30 mm is prepared to fill the litter 13 to a depth of 30 mm) is filled to the top with the litter 13 and leveled;
3) 20.0 g of saline solution 404 is dripped with a funnel 502 from a position 30 mm above the vicinity of the center of the litter 13 in 10 seconds;
4) After dripping, the litter 13 and the cylinder 501 are removed (when removing, place a plastic board over the top of the cylinder and invert the cylinder and the pet toilet sheet so that unnecessary moisture transfer between the litter 13 and the pet toilet sheet 503 does not occur, and then remove the litter 13 and the cylinder 501);
5) Weight B of the pet toilet sheet 503 is measured;
6) 100×(B−A)/20=liquid passing ratio As shown in FIG. 2, it is preferable to use a pet toilet sheet 503 wherein, the length w of 5 ml of saline solution flowing on it is no longer than 100 mm, when the sheet is placed along a slope 504 at a 45 degree angle and the 5 ml of saline solution is dripped from a height of 5 cm in one second on the sheet. In addition, it is preferable to use a sheet product having a water retention value of 200 g or more assuming that the sheet product has a size of 45 cm×34 cm, when the water retention value is figured by subtracting its weight before dehydration for 90 seconds by a hydro-extractor (90 G) from its weight after the dehydration wherein the sheet product has been soaked in saline solution for ten minutes, then pulled out, hung to drain off the water before it is to be dehydrated.

Because litter is conventionally used with a pet toilet sheet laid beneath a draining board which holds the litter, the foregoing liquid passing ratio can be measured by using a draining board filled with 30 mm of the litter, wherein the draining board is created so that fluid draining is most ideal according to the size of the granular materials.

As described in the foregoing, the animal litter according to the present invention has high liquid-passing properties, and remaining liquid can be absorbed with the passage of time. Therefore, it is easy to keep the litter in its state at the beginning of the use, and the generation of foul odor from excretory substances can be prevented.

In addition, the animal litter of the present invention can be used repeatedly for a long period of time, and thus, the amount of waste is small, cleaning involves little trouble, and it is cost-efficient, as well.

DESCRIPTION OF THE PREFERRED EMBODMIENT

Figure 1:
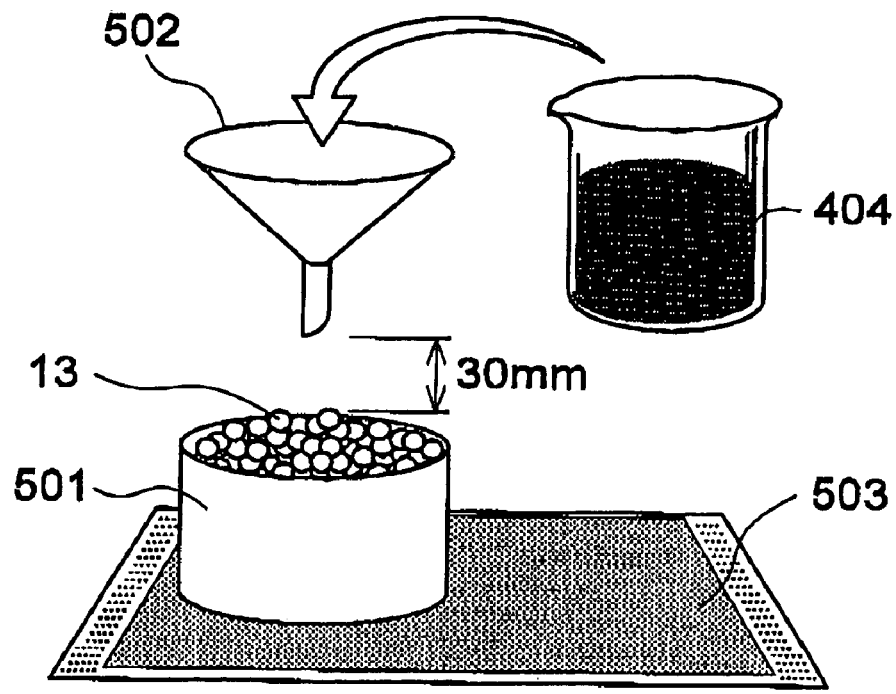
FIG. 1 is a diagram showing the measurement method for liquid passing.
Figure 2:
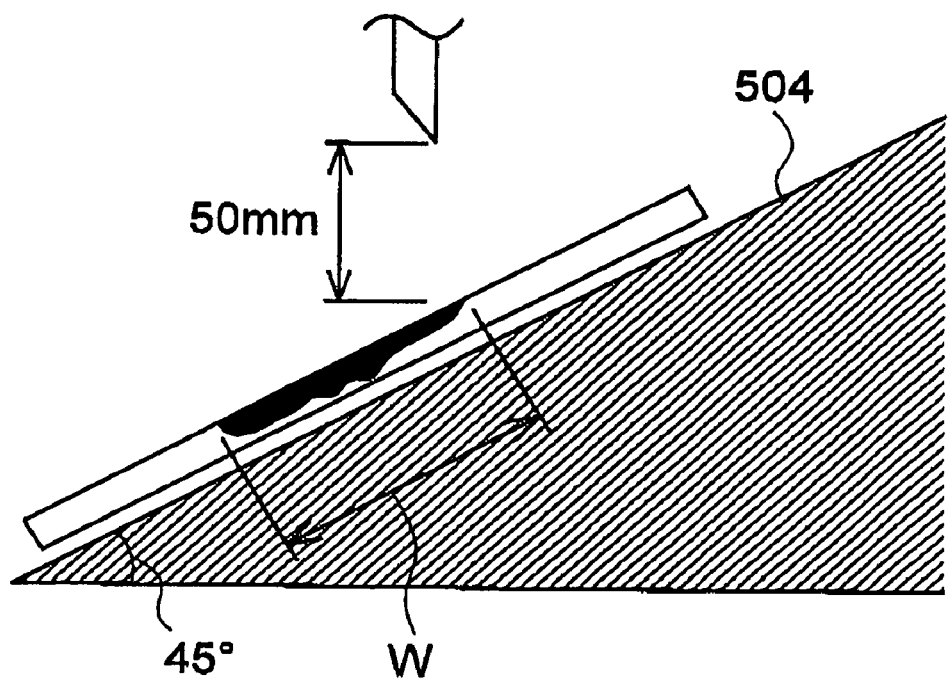
FIG. 2 is a diagram showing the measurement method for water retention amount in selection of pet toilet sheets.

The present invention is described in more detail hereafter.

"Animal" according to the present invention includes so-called pets such as dogs, cats, rabbits, and hamsters, additionally baby tigers, lions and the like. In addition, "litter" means a collection of granular materials formed into spheres, spheroids, or polyhedron, and the main material is preferably silica gel. "Liquid" is excreted from an animal and includes all moisture which can be passed through litter according to the present invention. Furthermore, "liquid-passing" means the passage of liquid through a certain point in the litter. Therefore, the larger the amount of liquid flowing through the perimeter of the granular materials is, the better the liquid-passage properties.

<Manufacturing the First Granular Material>

The first granular material according to the present invention has water-shedding properties. Water-shedding properties are obtained by performing water-shedding processing on the surface of base material having liquid-absorbing properties. Although methods of performing water-shedding processing are not particularly limited, but the water-shedding processing can be performed in which conventional methods (for example, processing with organic solvent solutions such as acrylic resin, urethane resin, silicone resin and the like, after applying fluorinated water-shedding agent) are performed on one or more types of base material selected from a group having liquid-absorbing properties comprising silica gel, bentonite, ground pulp, paper sand, and wood chips.

Additionally, water-shedding properties can be also obtained by employing materials which originally have water-shedding properties. With regards to materials originally having water-shedding properties, resin such as polyethylene and polypropylene, glass and the like are employed, These materials which have been processed into granular-form can be used.

<Manufacturing the Second Granular Material>

The second granular material according to the present invention has liquid-absorbing properties. Specifically, one or more types of base material selected from a group comprising silica gel, bentonite, ground pulp, paper sand, and wood chips formed into granular-shape is employed. The base material for the second granular material can be the same as the base material of the first granular material. For example, when using silica gel for the second granular material, it is manufactured as follows: first, raw silica gel powder is made into uniform powder by a powdering machine; next, with the concentrate solution of silica (SiO2) as the main ingredient, adhesive is formed by blending water and other materials (for example, polyvinyl alcohol (PVA)); subsequently, powdered silica gel is placed within a ball-molding machine, mixed with the adhesive and molded into balls of a diameter of 4 to 14 mm; and finally, this silica gel sphere is placed in a dryer at a temperature of 100 to 140° C. and dried. Additionally, material originally having water-shedding properties can be used as base material, and material which have liquid-absorbing properties such as silica gel, bentonite, ground pulp, paper sand, wood chips and liquid-absorbent polymer can be adhered thereto.

Deodorant for neutralizing the odor of excretory substances can be added to these granular materials. Deodorants include agent that neutralizes ammonia odor which causes urine odor, and that suppresses the decomposition of urine and reduces the putrefactive odor of urine. More specifically, organic acids, such as aliphatic carboxylic acid, and artificial enzymes, such as metal phthalocyanine, are employed as neutralizing agents. In addition, as deodorant which suppresses the decomposition of urine, thiazoline, organic halogenide, and Ag-zeolite antibacterial agents and the like are employed.

Figure 3:
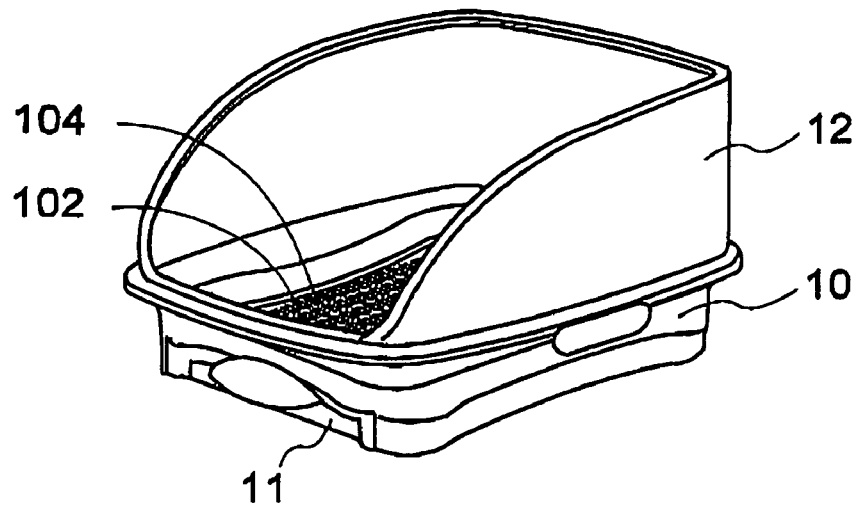
FIG. 3 is a diagram showing the litter in used state according to the present invention.
Figure 3:
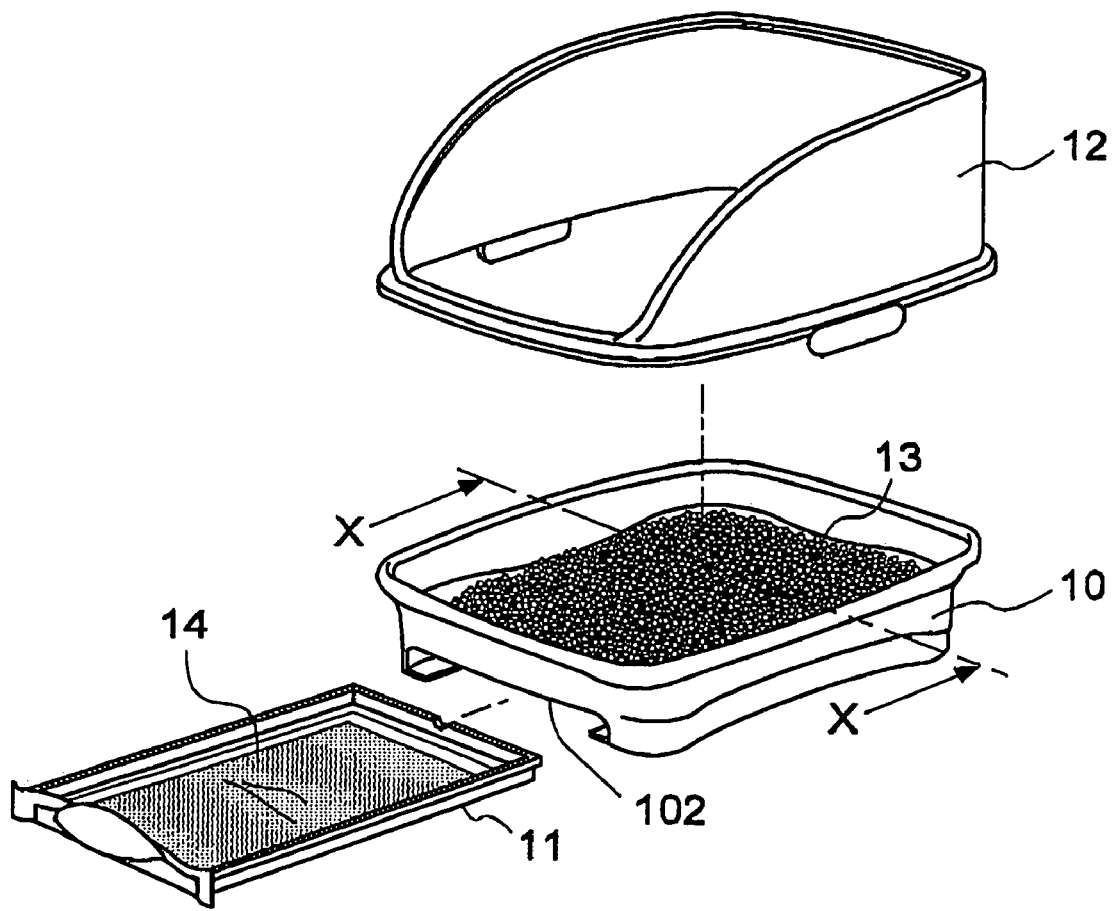
Figure 4:
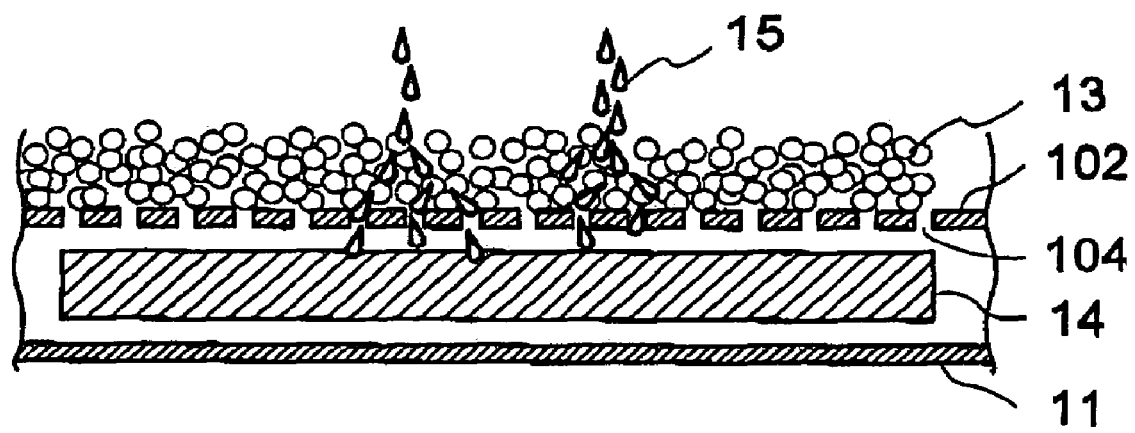
FIG. 4 is a diagram showing a partial cross-sectional drawing of the litter container shown in FIG. 3.

FIG. 3 is a diagram showing animal litter of the embodiment of the present invention, and FIG. 4 is a partially enlarged diagram of the cross-section of the litter container shown in FIG. 3 which stores the animal litter 13 and the liquid absorbent sheet 14 in the X-X direction.

The animal litter according to the present invention as shown in FIG. 3(A), is constructed with a box-shaped litter storage container 10 for storing litter comprising of a first granular materials and second granular materials, a liquid-absorbent sheet storage container 11 for storing liquid-absorbent sheet 14 which is located below the storage container 10 and is assembled to be inserted and removed at will, and a side surface cover 12 which is placed to cover the side surfaces above the litter storage container 10 as the main components. The bottom surface part 102 of the litter storage container 10 has a plurality of holes 104. These holes 104 are preferably polyhedron or circular, and are preferably of a size wherein litter 13 will not fall out.

As shown in FIG. 3(B), no less than 10 mm in the thickness of litter 13 is laid in layers on the upper surface of the bottom surface part 102 of the litter storage container 10. Furthermore, the thickness of litter 13 is preferable no less than 20 mm in case the subject animal is cat, since the cat will try to hide the excretion by digging into the litter 13. In addition, liquid-absorbent sheet 14 is placed within the liquid-absorbent sheet storage container 11.

FIG. 4 shows the cross-sectional view of the litter container storing litter 13 and liquid-absorbent sheet 14 of the present invention. When an animal excretes, liquid 15 first passes between litter 13, passes through holes 104 placed in the bottom surface part 102 of litter storage container 10, and is absorbed by the liquid-absorbent sheet 14 laid within liquid-absorbent sheet storage container 11. Then liquid 15 remaining in the litter 13 is absorbed within litter 13 with the passage of time.

EXAMPLE

A liquid-passing experiment was performed using litter according to the present invention. The test is conducted as follows: first, litter according to the present invention (sample 1), commercial litter (sample 2), and litter wherein the entire surface is water-shedding (sample 3) were laid with a depth of 30 mm inside containers whose bottoms have throating plates like drainboads; next, the containers holding the foregoing samples were placed on pet-toilet sheets, the weights of which have been measured beforehand; then, 20 cc of saline solutions were dripped from a height of approximately 30 mm for approximately 10 seconds to each containers; after leaving for 15 seconds, the weights of the pet-toilet sheet which have absorbed the liquid were measured. Furthermore, the amounts of liquid-passing were also calculated.

The results are shown in Table 1. As clarified in Table 1, in sample 1 and sample 3, the amount of liquid-passing increased by about 5%, compared to sample 2. However, water drops remained on the litter in sample 3. In sample 1, although the amount of liquid-passing remained within the increase rate of 2 to 4%, it was shown that residual water drops were minimal.

TABLE 1

|  | First time | Second time |
| --- | --- | --- |
| Sample 1 | 94.10% | 91.80% |
| Sample 2 | 89.50% | 88.20% |
| Sample 3 | 94.50% | 95.20% |

What is claimed is:

1. An animal litter comprising a plurality of granular materials wherein the plurality of granular material comprises:
   a first granular material having water-shedding properties; and
   a second granular material having liquid-absorbing properties;
   wherein a content of the first granular material is larger than a content of the second granular material.

2. The animal litter according to claim 1, wherein a surface area of the second granular material is larger than a surface area of the first granular material.

3. The animal litter according to claim 1, wherein the animal litter is used in combination with a liquid-absorbent sheet having liquid-absorbing properties.

4. The animal litter according to claim 1, wherein the first granular material is formed by a water-shedding process which is performed on a surface of a base material.

5. The animal litter according to claim 4 wherein the base material has liquid absorbing properties, and is selected form the group consisting of silica gel bentonite, ground pulp, paper sand, and wood chips.

6. The animal litter according to claim 1, wherein the first granular material is formed by processing with acrylic resin, urethane resin or silicon resin.

7. The animal litter according to claim 1, wherein the first granular material is formed by processing into granular form materials which originally have water-shedding properties and comprise at least one of polyethylene, propylene and glass.

8. The animal litter according to claim 1, wherein a liquid passage ratio of the plurality of granular materials is at least 50%.

9. An animal litter comprising a plurality of granular materials wherein the plurality of granular material comprises:
   a first granular material having water-shedding properties; and
   a second granular material having liquid-absorbing properties;
   wherein a liquid passage ratio of the plurality of granular materials is 50% or more.

* * * * *